US012626517B2

(12) United States Patent
Liemhetcharat et al.

(10) Patent No.: US 12,626,517 B2
(45) Date of Patent: May 12, 2026

(54) HIGH-FIDELITY VARIATION OF DETECTED OBSTACLES IN AUTONOMOUS VEHICLE LOGS

(71) Applicant: DoorDash, Inc., San Francisco, CA (US)

(72) Inventors: Allison Liemhetcharat, San Ramon, CA (US); Chuang Wang, Sebastopol, CA (US)

(73) Assignee: DoorDash, Inc., San Francisco, CA (US)

( * ) Notice: Subject to any disclaimer, the term of this patent is extended or adjusted under 35 U.S.C. 154(b) by 43 days.

(21) Appl. No.: 18/907,299

(22) Filed: Oct. 4, 2024

(65) Prior Publication Data

US 2026/0100052 A1    Apr. 9, 2026

(51) Int. Cl.
*G06V 20/58*          (2022.01)

(52) U.S. Cl.
CPC ................................... *G06V 20/58* (2022.01)

(58) Field of Classification Search
CPC .... B60W 30/06; B60W 60/001; B60W 50/14;
B60W 60/0016; G06V 20/58; G06V
20/52; G06V 20/56; G08G 1/165; G06F
30/20; G05D 1/0088
USPC ......................................................... 348/148
See application file for complete search history.

(56) References Cited

U.S. PATENT DOCUMENTS 6,384,850 B1    5/2002  McNally et al.
6,871,325 B1    3/2005  McNally et al.

6,982,733 B1    1/2006  McNally et al.
8,146,077 B2    3/2012  McNally et al.
9,009,060 B2    4/2015  McNally
9,747,651 B2    8/2017  McNally
(Continued)

FOREIGN PATENT DOCUMENTS

WO          0122289 A1      3/2001

OTHER PUBLICATIONS

Civil Action No. 2:23-CV-2165-WSH, Amended Complaint for Patent Infringement—*Ameranth, Inc.*, Plaintiff, V. *Doordash, Inc., Eat'n Park Restaurants, LLC, and Eat'n Park Hospitality Group, Inc.*, Defendants, Sep. 17, 2024, pp. 1-91.

*Primary Examiner* — Nathnael Aynalem
(74) *Attorney, Agent, or Firm* — Kilpatrick Townsend & Stockton LLP

(57)          ABSTRACT

Method includes inputting log data to perception, including sensor data of objects around AV and information about events occurring with respect to AV and obstacle, information including obstacle parameters, each having actual value detected by sensors; detecting, by perception from sensor data, coordinate region within which obstacle appears; outputting, by perception, data including values for obstacle parameters, each associated with actual or synthetic value; inputting values into planner, to generate values for parameters of AV; during re-run of perception, detecting, by perception, coordinate region in log data and detecting obstacle, as object overlapping coordinate region; outputting, by perception, updated data including updated values for obstacle parameters, each associated with actual value or updated synthetic value; inputting updated values into planner, to generate updated values for parameters of AV; and generating validation result based on values for parameters for AV and updated values for parameters for AV.

20 Claims, 6 Drawing Sheets

(56)                    References Cited

U.S. PATENT DOCUMENTS

| | | | |
|---|---|---|---|
| 10,970,797 B2 | 4/2021 | McNally | |
| 11,276,130 B2 | 3/2022 | McNally | |
| 11,372,426 B2 | 6/2022 | Shih et al. | |
| 11,568,100 B2 * | 1/2023 | O'Malley | ................ G07C 5/02 |
| 11,842,415 B2 | 12/2023 | McNally | |
| 11,847,587 B1 | 12/2023 | McNally | |
| 12,204,823 B1 * | 1/2025 | Capell | .................... G06N 20/00 |
| 2014/0249937 A1 | 9/2014 | McNally | |
| 2023/0311930 A1 * | 10/2023 | Lasram | ................. G01S 13/931 |
| | | | 701/2 |
| 2023/0311932 A1 * | 10/2023 | Lasram | .................... G07C 5/02 |

* cited by examiner

FIG. 4A

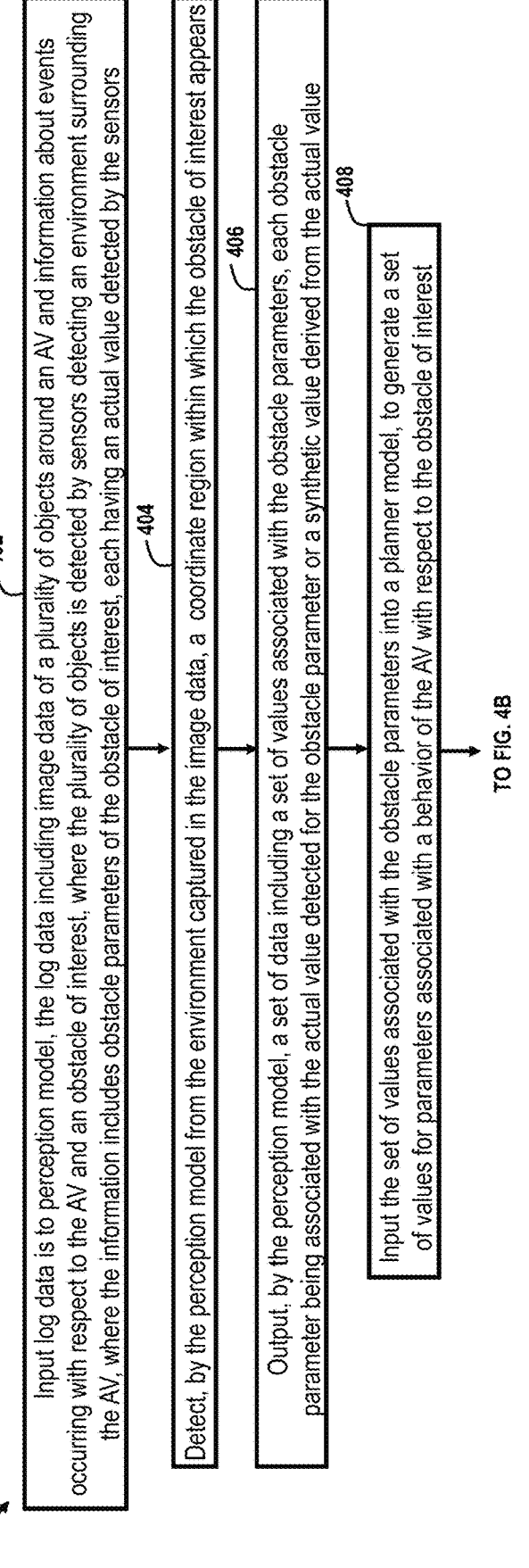

400

402

Input log data is to perception model, the log data including image data of a plurality of objects around an AV and information about events occurring with respect to the AV and an obstacle of interest, where the plurality of objects is detected by sensors detecting an environment surrounding the AV, where the information includes obstacle parameters of the obstacle of interest, each having an actual value detected by the sensors

404

Detect, by the perception model from the environment captured in the image data, a coordinate region within which the obstacle of interest appears

406

Output, by the perception model, a set of data including a set of values associated with the actual value detected for the obstacle parameter or a synthetic value derived from the actual value parameter being associated with the obstacle parameters, each obstacle

408

Input the set of values associated with the obstacle parameters into a planner model, to generate a set of values for parameters associated with a behavior of the AV with respect to the obstacle of interest

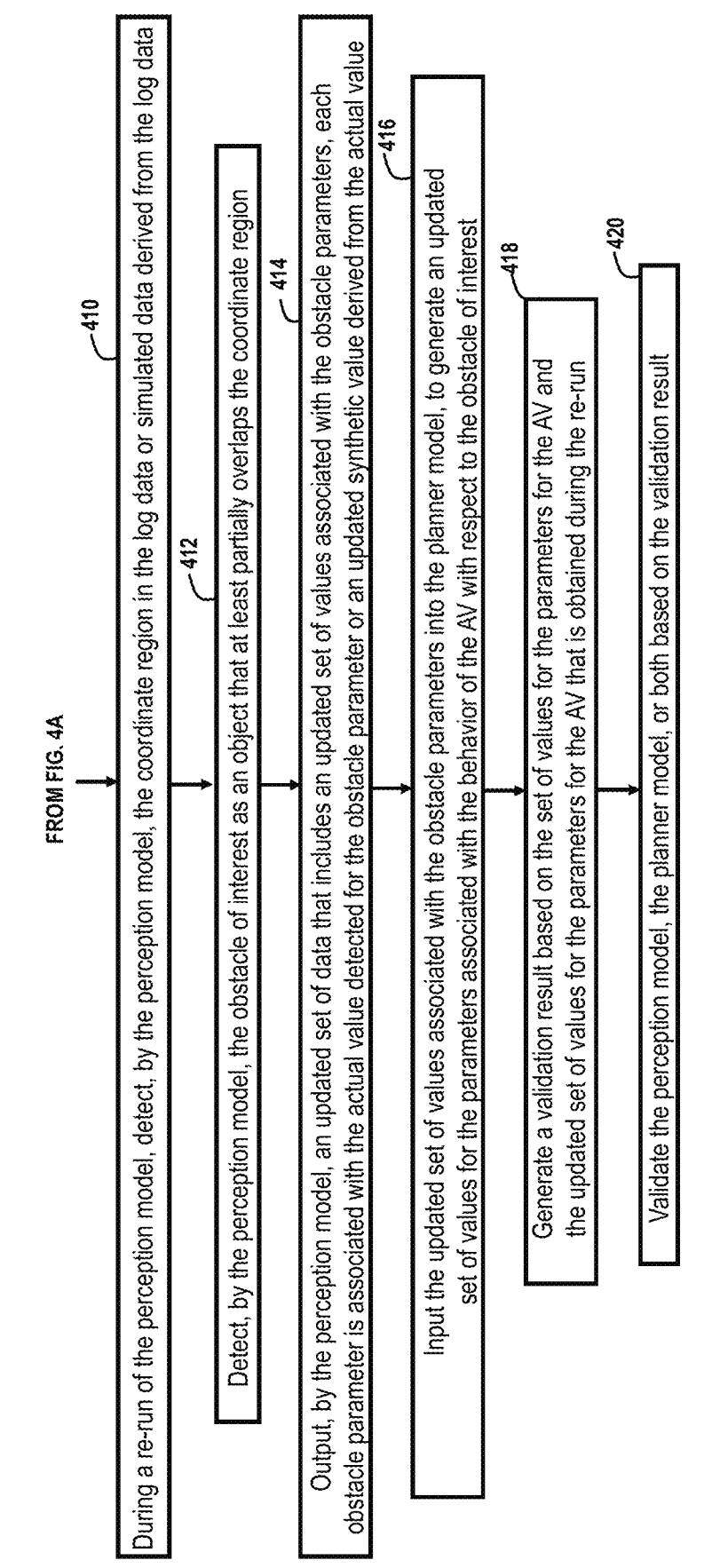

FROM FIG. 4A

410

During a re-run of the perception model, detect, by the perception model, the coordinate region in the log data or simulated data derived from the log data

412

Detect, by the perception model, the obstacle of interest as an object that at least partially overlaps the coordinate region

414

Output, by the perception model, an updated set of data that includes an updated set of values associated with the obstacle parameters, each obstacle parameter is associated with the actual value detected for the obstacle parameter or an updated synthetic value derived from the actual value

416

Input the updated set of values associated with the obstacle parameters into the planner model, to generate an updated set of values for the parameters associated with the behavior of the AV with respect to the obstacle of interest

418

Generate a validation result based on the set of values for the parameters for the AV and the updated set of values for the parameters for the AV that is obtained during the re-run

420

Validate the perception model, the planner model, or both based on the validation result

HIGH-FIDELITY VARIATION OF DETECTED OBSTACLES IN AUTONOMOUS VEHICLE LOGS

BACKGROUND

Autonomous vehicles (AVs), also known as self-driving cars, driverless vehicles, and robotic vehicles, are vehicles that use sensors to sense the environment and move without human input. Automation technology enables the AVs to drive on roadways and perceive the surrounding environment accurately and quickly, including but not limited to various obstacles such as pedestrians, animals, signs, trees, traffic lights, etc. In some cases, the AVs can be used to pick up passengers and drive the passengers to selected destinations, pick up a delivery order and drive it to a destination, etc.

For example, the AV may drive on a road and sense the events occurring in the environment surrounding the AV, by using sensors. The sensed data, e.g., a log data from the real world, is offloaded from the AV. For example, if a pedestrian is crossing the road in front of the AV, the autonomous system of the AV can control the AV to take an action (e.g., to stop, slow down, etc.) or a human can take control over. Simulations can be performed on the log data to play back the recorded scenario and determine how the AV could control itself if the human did not take over. Based on the simulations, the control commands for the autonomous system of the AV can be developed or improved.

SUMMARY

Embodiments of the present disclosure provide systems, methods, and apparatuses for addressing the above problems by providing multiple simulation scenarios based on modifications of a real-life log data.

Some embodiments include a method performed by one or more processors of a computer system, the method including: inputting log data to a perception model, the log data including sensor data of a plurality of objects around an autonomous vehicle (AV) and information about events occurring with respect to the AV and an obstacle of interest among the plurality of objects, where the plurality of objects is detected by on-vehicle sensors detecting an environment surrounding the AV, where the information includes obstacle parameters associated with the obstacle of interest, each obstacle parameter having an actual value detected by the on-vehicle sensors; detecting, by the perception model from the environment captured in the sensor data, a coordinate region within which the obstacle of interest appears; outputting, by the perception model, a set of data including a set of values associated with the obstacle parameters, each obstacle parameter being associated with the actual value detected for the obstacle parameter or a synthetic value derived from the actual value; inputting the set of values associated with the obstacle parameters into a planner model, to generate a set of values for parameters associated with a behavior of the AV with respect to the obstacle of interest; during a re-run of the perception model, detecting, by the perception model, the coordinate region in the log data or simulated data derived from the log data; detecting, by the perception model, the obstacle of interest as an object that at least partially overlaps the coordinate region; outputting, by the perception model, an updated set of data that includes an updated set of values associated with the obstacle parameters, each obstacle parameter is associated with the actual value detected for the obstacle parameter or an updated synthetic value derived from the actual value; inputting the updated set of values associated with the obstacle parameters into the planner model, to generate an updated set of values for the parameters associated with the behavior of the AV with respect to the obstacle of interest; generating a validation result based on the set of values for the parameters for the AV and the updated set of values for the parameters for the AV that is obtained during the re-run; and validating the perception model, the planner model, or both based on the validation result.

Some embodiments include a computer system including: a processor; and a non-transitory computer readable medium including instructions that, when executed by the processor, cause the processor to perform a method including: inputting log data to a perception model, the log data including (1) sensor data of a plurality of objects around an autonomous vehicle (AV) and (2) information about events occurring with respect to the AV and an obstacle of interest among the plurality of objects, where the plurality of objects is detected by on-vehicle sensors detecting an environment surrounding the AV, where the information includes obstacle parameters associated with the obstacle of interest, each obstacle parameter having an actual value detected by the on-vehicle sensors; detecting, by the perception model from the environment captured in the sensor data, a coordinate region within which the obstacle of interest appears; outputting, by the perception model, a set of data including a set of values associated with the obstacle parameters, each obstacle parameter being associated with the actual value detected for the obstacle parameter or a synthetic value derived from the actual value; inputting the set of values associated with the obstacle parameters into a planner model, to generate a set of values for parameters associated with a behavior of the AV with respect to the obstacle of interest; during a re-run of the perception model, detecting, by the perception model, the coordinate region in the log data or simulated data derived from the log data; detecting, by the perception model, the obstacle of interest as an object that at least partially overlaps the coordinate region; outputting, by the perception model, an updated set of data that includes an updated set of values associated with the obstacle parameters, each obstacle parameter is associated with the actual value detected for the obstacle parameter or an updated synthetic value derived from the actual value; inputting the updated set of values associated with the obstacle parameters into the planner model, to generate an updated set of values for the parameters associated with the behavior of the AV with respect to the obstacle of interest; generating a validation result based on the set of values for the parameters for the AV and the updated set of values for the parameters for the AV that is obtained during the re-run; and validating the perception model, the planner model, or both based on the validation result.

These and other embodiments of the disclosure are described in detail below. For example, other embodiments are directed to systems, devices, and computer-readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIGS. 4A and 4B show a simplified block diagram of a processing performed by a model validation system in accordance with various embodiments.

TERMS

Figure 1:
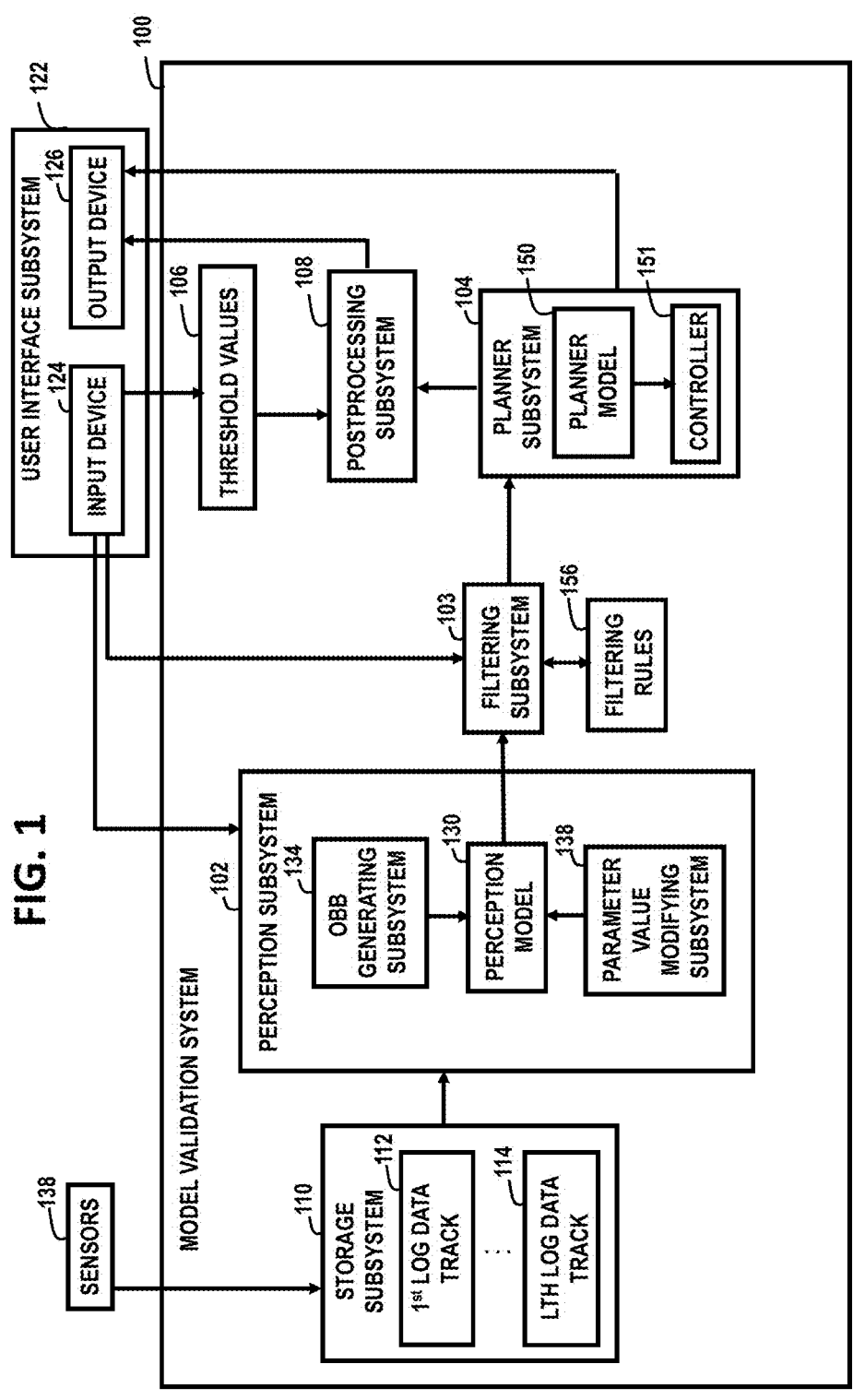
FIG. 1 illustrates an example of a model validation system according to at least one embodiment.

Prior to further describing embodiments of the disclosure, description of related terms is provided.

A "user" can be a person or thing that employs some other thing for some purpose. A user may include an individual that uses a user device and/or a website. The user may also be referred to as a "consumer" or "customer" depending on the type of the website.

A "user device" may include any suitable computing device that can be used for communication. A user device may also be referred to as a "communication device." A user device may provide remote or direct communication capabilities. Examples of remote communication capabilities include using a mobile phone (wireless) network, wireless data network (e.g., 3G, 4G, 5G, or similar networks), Wi-Fi, Wi-Max, or any other communication medium that may provide access to a network such as the Internet or a private network. Examples of user devices include desktop computers, mobile phones (e.g., cellular phones), PDAs, tablet computers, net books, laptop computers, etc. Further examples of user devices include wearable devices, such as smart watches, fitness bands, ankle bracelets, etc., as well as automobiles with remote or direct communication capabilities. A user device may include any suitable hardware and software for performing such functions, and may also include multiple devices or components (e.g., when a device has remote access to a network by tethering to another device—i.e., using the other device as a modem-both devices taken together may be considered a single communication device).

A "server computer" may include a powerful computer or cluster of computers. For example, the server computer can be a large mainframe, a minicomputer cluster, or a group of computers functioning as a unit. In some cases, the server computer may function as a web server or a database server. The server computer may include any hardware, software, other logic, or combination of the preceding for servicing the requests from one or more other computers. The term "computer system" may generally refer to a system including one or more server computers.

A "processor" or "processor circuit" may refer to any suitable data computation device or devices. A processor may include one or more microprocessors working together to accomplish a desired function. The processor may include a CPU that includes at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

The term "providing" may include sending, transmitting, displaying or rendering, making available, or any other suitable method. While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

As used herein, obstacles are anything in the world that is not a part of the static environment.

As used herein, non-varied parameters are parameters of the obstacle that are not varied for a particular scenario. Varied parameters are parameters of the obstacle that are varied for the particular scenario.

As used herein, a synthetic sensor data set is associated with a set of parameters associated with an obstacle, where one or more of the values of the synthetic sensor data set are actual values sensed by the sensors for one or more non-varied parameters of the set of parameters and one or more values are synthetic values that are derived from the actual values sensed by the sensors for one or more varied parameters of the set of parameters.

As used herein, a start detection time point is a time point at which the obstacle is first detected by the sensors or an event with respect to the obstacle is first detected by the sensors. For example, in the case of the pedestrian crossing the road, the start detection time point may be a time point when the pedestrian (e.g., a bounding box of the pedestrian that is drawn around the pedestrian centroid) intersects with a predetermined line, e.g., a border of the road, a line located at 1 meter prior the border of the road in the direction of crossing, etc.

As used herein, a total detection time period is measured from the start detection time point to a stop detection time point (e.g., a time point at which the sensors detected a termination event for the obstacle). For example, in the case of the pedestrian crossing the road, the stop detection time point may be a time point when the pedestrian (e.g., a bounding box of the pedestrian that is drawn around the pedestrian centroid) intersects with a predetermined line, e.g., an opposing border of the road on the side opposing the side where the crossing of the road started, a line located at 1 meter past the opposing border of the road in the direction of crossing, etc.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. Introduction

Embodiments can provide systems, methods, and apparatuses for providing multiple simulation scenarios based on synthetic sensor data sets generated from a real-life log data.

As mentioned above, AVs are designed to navigate autonomously in an environment without human input or intervention by using sensors that enable the AV to "see" the surrounding environment. As non-limiting examples, AVs can include sensor systems including Light Detection and Ranging (LiDAR), Radio Detection and Ranging (RADAR), ultrasonic, inertial measurement unit (IMU), global navigation satellite system (GNSS), an imaging sensor (e.g., a camera), etc.

The AV may collect and store or transmit to an external device log data while the AV is in operation (e.g., navigating in the environment). For example, the AV may collect data using one or more on-vehicle sensors.

Typically, to verify the safety of the autonomous vehicle (AV) software, each release version of the software is checked against thousands (100k+) simulations. Some of these simulations are log-based (based on a real-life AV log), and some are synthetic (created by a human without a real-life AV log). Log-based simulations provide the benefit of being able to run the full autonomy stack (e.g., perception, prediction, planner).

In one log-based approach, the "staged" log-based simulation scenarios can be created, where the AV is stationary and scenarios are staged around the AV (e.g., a car turning into a driveway). Using log-based simulation, the initial conditions of the AV (e.g., its position, and its initial speed) can be varied, while the rest of the log-based simulation is kept identical (i.e., the detected obstacles in the environment).

For example, while the AV is driving along the road, e.g., the bicycle lane, a pedestrian walks in front of the AV 10 meters ahead of the AV. Typically, the autonomous system of the AV would command the AV to stop, or a local operator would take control of the AV. Simulation is then used to answer the question what would the AV have done if the human did not take over.

In the simulation, the log data of what the AV recorded in the real world is played back up to the moment of human intervention. Instead of letting the human take over, the autonomous system continues controlling the AV and the AV actions can be simulated. For example, the AV can be commanded to slow down (e.g., in the recorded real world situation of the pedestrian crossing the road). Then, the simulation proceeds to determine whether the AV actually slows down, the time to full stop, etc. That is, the commands can be provided to change the AV's behavior. The rest of the simulation is playing back the events that really happened in the world. These events are not varied.

Accordingly, the log-based simulation scenarios allow to create variations of the scenarios, but come with certain drawbacks. First, only the AV conditions are varied (e.g., position, speed), but not the conditions of the environment and obstacles. Second, only a subset of scenarios can be staged. For example, dynamic situations on the road (e.g., a car overtaking the robot), cannot be effectively staged. For example, if the AV drives on the road and someone drives a car to overtake the AV, such a scenario cannot be varied along the dimensions of the AV's initial conditions. For example, if the initial position or speed of the AV is changed, then the overtaking scenario might not occur, e.g., the AV might be too slow or too far back for any interesting interaction to take place. Further, with other obstacles on the road (e.g., other cars, bikes, etc.), changing the initial conditions of the AV may cause those obstacles to collide with the AV in simulation. For example, a bike that is behind the AV may collide with the AV if the AV's initial position is further back. Another example would be if the AV's initial speed is slower than what happened in the log.

It is difficult to find or create variations of scenarios and, thus, it is problematic to fully test the AV's software based on the real-life AV logs.

To solve the above-described problems of the log-based technique, the synthetic-based technique can be used. The synthetic simulations generate a perception output and only run the planner algorithms. The synthetic simulations are not realistic because they are not run on the real-life events and, thus, the input to the planner model is less realistic, as compared to executing the planner model on the real-life events. Having not realistic inputs is problematic because the behavior of AV can be assessed only with subpar accuracy.

In synthetic simulations, the identified obstacles can be converted into purely synthetic objects to create synthetic (e.g., human-created) scenarios. For example, suppose obstacle O is a car overtaking the AV, and is identified to be an agent whose behavior should be varied. For example, obstacle O (an obstacle detected by perception) can be converted into a purely synthetic agent A, with characteristics similar to O (typically based on the log segment where O is from). The behavior and parameters of synthetic agent A can then be varied to create variations of the scenario. If, for example, the obstacle is a pedestrian crossing the road in front of the AV, the scenario can be created where the pedestrian crosses the road in front of the AV at 10 meters and this pedestrian will react to what the AV is doing. This is entirely in the simulation world so this is not based on the real world. Because this is based on simulation, a great number of parameters can be changed. For example, the pedestrian can cross the road at 11 meters, 9 meters, or anywhere in the range from 9 to 11 meters from the AV, e.g., a distance to the AV can be simulated. Likewise, the speed of the pedestrian can be varied, etc.

However, as mentioned above, because a detected obstacle O is converted into a synthetic agent A, inputs to the planner algorithm of the synthetic agent A are less realistic than that of the obstacle O, since the perception algorithm is not run on synthetic agent A. In particular, the perception algorithm tends to have certain artifacts or characteristics (possibly due to the algorithm or sensors) that cannot be replicated through synthetic agent A, so the input to the planner algorithm becomes less realistic (compared to running the scenario on the original log data, or running the AV in the real world).

To solve the above-described problems, a technique that uses a combination of a log-based technique and a synthetic-based technique can be used. However, this technique poses a problem of tracking the obstacles in perception algorithms re-runs that can be executed for simulation as frequently as every day, e.g., whenever there is a change in the perception algorithm.

Specifically, the synthetic-based technique requires unique track identifiers (IDs) for the obstacles. For example, the perception algorithm generates information related to the obstacles detected by the sensors where each obstacle is assigned a unique track identifier (ID). The track IDs are consistent across one run of perception algorithm (e.g., the same obstacle will have the same track ID1 at time T1 and time T2). However, the track IDs are not consistent across multiple runs of perception algorithm. Therefore, when simulation re-runs perception algorithm, the same obstacle may have track ID2 at time T1 and time T2. As such, the track ID of the obstacle that is assigned at the previous run cannot be used in subsequent re-runs to identify the obstacle.

The embodiments disclosed herein provide improved systems and methods for creating multiple simulation scenarios based on synthetic sensor data sets generated from a real-life log data.

In the disclosed techniques, a single real-life log can be used to create multiple synthetic scenarios (in the 100s or 1000s), where the process can be performed across segments of the real-life log and/or across multiple real-life logs. That is, the synthetic simulations can be incorporated with the real-life data.

In the disclosed techniques, the obstacles are identified by the surrounding region and not by their track IDs. Thus, the disclosed techniques can accurately identify obstacles in the re-runs of the perception algorithms.

Disclosed techniques allow playback of (1) just the identified obstacles (with possible variations), playback of (2) non-identified obstacles (i.e., the original log without the identified obstacles), and playback containing (3) a combination of the two (i.e., the original log without the identified obstacles and the identified obstacles with variations merged together). By doing so, the scenarios can be created that (1) only contain the identified obstacle, in order to isolate the interaction for testing; scenarios that (2) only contain non-identified obstacles, in order to remove obstacles from the scenario (e.g., if leaves falling causes the autonomy system to fail, the leaves can be excluded in a log-based simulation to test what autonomy would have done without the leaves); or scenarios that (3) contain the identified and non-identified obstacles, in order to test how the autonomy system would perform in similar-yet-different variations of the real world scenario (e.g., if the car is cutting in front of the AV appeared slightly earlier, later, or was closer to the AV, etc.).

Disclosed techniques preserve the output of the perception algorithms with respect to the obstacle, so such artifacts and characteristics remain (e.g., artifacts caused by the perception algorithm such as bounding boxes not quite aligned with the obstacle, variance in the detected speed/yaw of the obstacle compared to ground truth, etc.), allowing the planner algorithm to continue to have realistic input, e.g., as if the AV were running in the real world. Provided a realistic input, the disclosed techniques can more accurately assess the AV's behavior if the same scenario occurs when the AV is autonomously running in the real world.

Disclosed techniques allow to use the current perception output on the real-life log data (with all its idiosyncrasies and characteristics), and alter the outputs in a fashion that maintains its realism/characteristics, yet allows variations in the obstacle's position, time, and playback speed. In addition, because the disclosed techniques identify the obstacles in a perception-independent manner by a coordinate region, the benefit of using the current perception output with its characteristics is maintained as the perception improves and changes its output, e.g., with software upgrades.

In embodiments, the log data can be input to the perception model. The log data includes (1) sensor data of a plurality of objects around the AV and (2) information about events occurring with respect to the AV and a plurality of obstacles among the plurality of objects. The plurality of objects is detected by on-vehicle sensors detecting an environment surrounding the AV. Each obstacle of the plurality of obstacles is associated with a set of parameters and the information in the log data includes, for each parameter of the set of parameters that is associated with the obstacle, an actual value corresponding to a value detected by the on-vehicle sensors.

The perception model can detect, from the environment captured in the sensor data, a coordinate region within which an obstacle of interest appears, the obstacle of interest being included in the plurality of obstacles. The perception model can then output a plurality of sensor data sets including a first plurality of sensor data sets and a second plurality of sensor data sets. The plurality of sensor data sets are respectively associated with the plurality of obstacles, the first plurality of sensor data sets is associated with the obstacle of interest, and the second plurality of sensor data sets are associated with other obstacles.

Each set of the first plurality of sensor data sets includes a set of values for obstacle parameters associated with the obstacle of interest, where the obstacle parameters include one or more non-varied obstacle parameters, which are not varied, and one or more varied obstacle parameters, the actual values of which are varied. The set of values includes one or more synthetic values for the varied obstacle parameters and one or more actual values for the one or more non-varied obstacle parameters. Each set of the second plurality of sensor data sets may be similarly structured for an associated obstacle.

The plurality of sensor data sets can be subjected to filtering based on the rules. For example, the second plurality of sensor data sets may be filtered out.

Then, each set of the first plurality of sensor data sets for the obstacle parameters is input into the planner model, to generate a set of control values for parameters associated with a behavior of the AV with respect to the obstacle of interest.

In some embodiments, the first plurality of sensor data sets and the second plurality of sensor data sets can be provided to the planner model.

During a re-run of the perception model, the coordinate region in the log data or simulated data derived from the log data can be detected to identify the obstacle of interest as an object that at least partially overlaps the coordinate region. The perception model can then output an updated plurality of sensor data sets including an updated first plurality of sensor data sets and an updated second plurality of sensor data sets. Each set of the updated first plurality of sensor data sets includes an updated set of values for the obstacle parameters, where the updated set of values includes one or more updated synthetic values for the varied obstacle parameters and one or more actual values for the one or more non-varied obstacle parameters. Each set of the updated second plurality of sensor data sets may be similarly structured for an associated obstacle.

The updated plurality of sensor data sets can be subjected to filtering based on the rules. For example, the updated second plurality of sensor data sets may be filtered out.

Then, each set of the updated first plurality of sensor data sets for the obstacle parameters can be input into the planner model, to generate an updated set of control values for the parameters associated with the behavior of the AV with respect to the obstacle of interest.

In some embodiments, the updated first plurality of sensor data sets and the updated second plurality of sensor data sets can be provided to the planner model.

A validation result can be generated based on the set of control values for the parameters for the AV and the updated set of control values for the parameters for the AV that is obtained during the re-run.

Based on the validation result, the perception model, the planner model, or both can be validated.

II. Model Validation System

FIG. 1 is a simplified block diagram of a model validation system 100 according to various embodiments. The model validation system 100 may be implemented using one or more computer systems, each computer system having one or more processors. The model validation system 100 may include multiple components and subsystems communicatively coupled to each other via one or more communication mechanisms. For example, in the embodiment depicted in FIG. 1, the model validation system 100 includes a perception subsystem 102, a filtering subsystem 103, a planner subsystem 104, and a postprocessing subsystem 108.

These subsystems may be implemented as one or more computer systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The model validation system 100 depicted in FIG. 1 is merely an example and is not intended to unduly limit the scope of embodiments. Many variations, alternatives, and modifications are possible. For example, in some implementations, the model validation system 100 may have more or fewer subsystems or components than those shown in FIG. 1, may combine two or more subsystems, or may have a different configuration or arrangement of subsystems. The model validation system 100 and subsystems depicted in FIG. 1 may be implemented using one or more computer systems, such as the computer system depicted in FIG. 5.

As shown in FIG. 1, the model validation system 100 also includes a storage subsystem 110 that may store the various data constructs and programs used by the model validation system 100. For example, the storage subsystem 110 may store data for one or more log data tracks, e.g., a first log data track 112 to an Lth log data track 114. The data in each of the first log data track 112 to the Lth log data track 114 may include raw sensor data (e.g., received from sensors sensing the environment around the AV), processed sensor data, filtered sensor data, or the like.

As described in detail below, the perception subsystem 102 may use any one from the first log data track 112 to the Lth log data track to create sensor data sets (e.g., synthetic sensor data sets) by varying actual values of parameters from the log data. The planner subsystem 104 may receive the synthetic sensor data sets and create a simulation scenario based on the sensor data sets. The AV response then may be measured and compared with the thresholds, to validate the execution of perception.

The model validation system 100 can be interfaced with (or include) a user interface (UI) subsystem 122 including one or more input devices 124 for receiving a user input. The UI subsystem 122 may be implemented in an electronic device such as a computer, a mobile phone, etc.

Although FIG. 1 illustrates only one input device 124, the UI subsystem 122 may include a plurality of input devices. The plurality of input devices may take any suitable form, e.g., buttons, keyboard, mouse, microphone, etc. The UI subsystem 122 may further include an output device 126 that may be a display screen. In some instances, the output device 126 may be a touch screen including a display screen for providing a display output and a touch pad serving as one of the input devices 124.

The log data in the environment of the AV may be collected by the sensors installed on the AV, on the road, etc., as described in the detail below with reference to FIG. 2.

A. Collecting Log Data

Figure 2:
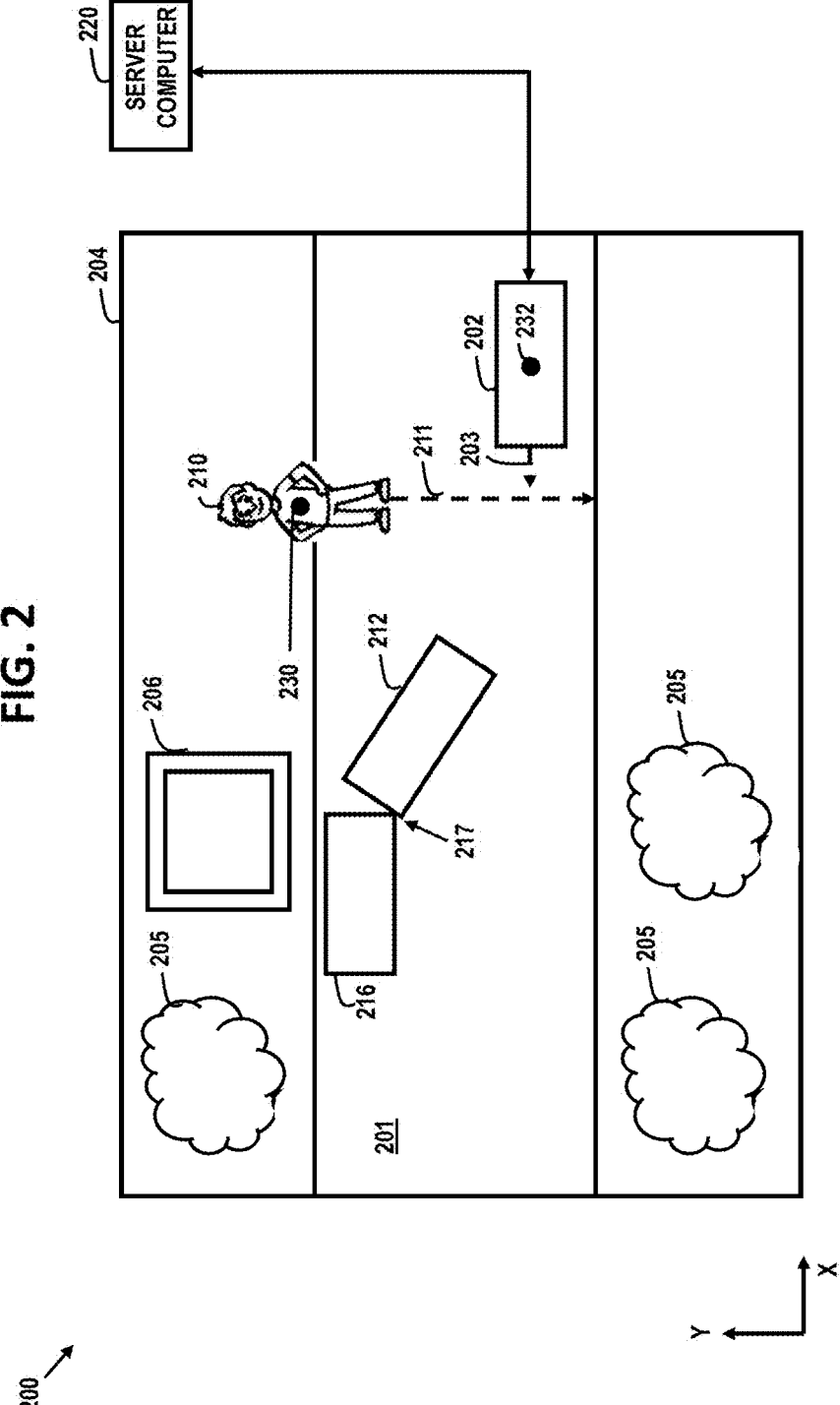
FIG. 2 shows an example of a system where AV collects data using sensors, in accordance with some embodiments.

FIG. 2 illustrates an example of a system 200 where an AV may be configured to implement data collection and/or data offload. In an example, the system 200 can include a road 201 and an AV 202 traveling on the road 201 along an X-axis in a direction 203, e.g., the log data collected may include information about the AV traveling on the road in the direction 203 based on time at which the sensors detect various objects in the environment 244.

The log data may include information about moving objects (e.g., obstacles) and, optionally, information about the stationary objects such as trees 205 and a building 206. The information about the objects can be obtained from the on-vehicle sensors, on the road sensors, satellite sensors, etc.

In FIG. 2, the objects interfering with the AV 202 may include, in an order of time, a pedestrian 210 crossing the road 201 along a path 211, a second vehicle 212, and a third vehicle 216. The second vehicle 212 may be involved in a collision event 217 with the third vehicle 216.

As illustrated, the system 200 may include a server computer 220. The server computer 220 may communicate with the AV 202 via a communication network, e.g., by transmitting data to and receiving data from the AV 202. Examples of the communication network may include, but are not limited to, Ultra-Wideband (UWB), Li-Fi, cellular, Wi-Fi, Wireless Local Area Network (WLAN), Low Power Wide Area Network (LPWAN), Bluetooth, satellite-based (e.g., SpaceX Starlink, Amazon Kuiper), infrared, etc.

In some instances, the AV 202 may include on-vehicle sensor systems such as LiDAR, RADAR, and cameras capable of collecting sensor data from the environment 204 where the AV 202 is autonomously navigating. In some embodiments, the server computer 220 may transmit (e.g., via the communication network) one or more data collection triggers (e.g., signals) that may be received by an AV computing device installed on the AV 202. For example, the server computer 220 may include a user interface (UI) providing a graphical UI (GUI) having data fields for receiving a user input that can specify one or more data collection triggers. In certain implementations, the UI subsystem 122 (see FIG. 1) may be implemented in the server computer 220.

In some embodiments, the AV 202 collects the sensor data within a specified time frame. For example, the AV 202 may collect and store LiDAR data for next 24 hours while the AV 202 is autonomously navigating in the environment 204. As another example, the sensor data can be assembled from previously stored data on the AV 202 (e.g., retrieve LiDAR data from the last 2 hours).

In another example, conditions specified by the data collection triggers may instruct the AV 202 to collect sensor data based on a location (e.g., location of the AV 202 such as a geographic location).

Although FIG. 2 shows the server computer 220 as a component separate from the model validation system 100, this is not intended to be limiting. In some implementations, the server computer 220 can be incorporated in the model validation system 100, or the model validation system 100 may perform the functionalities of the server computer 220.

B. Generating Synthetic Sensor Data

As mentioned above with reference to FIG. 1, the perception subsystem 102 receives the log data. For simplicity, the description below is provided with regard to the first log data track 112 and the scenario of FIG. 2. However, any log data of any environment can be similarly processed.

As shown in FIG. 1, the perception subsystem 102 includes a perception model 130. The perception model 130 is configured to execute one or more perception algorithms that are subjected to numerous re-runs, e.g., in the case of the software update. The perception model 130 may receive information included in the first log data track 112 that captured the environment associated with the movement of the AV 202, e.g., various objects.

The perception model 130 performs certain processing on the log data, to detect obstacles and output values of parameters associated with each obstacle as time series data. As used herein, obstacles are anything in the world that is not a part of the static environment. Stationary objects, e.g., the roads, buildings, etc., are not part of the output of the perception model 130.

As described in the detail below, the perception model 130 can identify, in the log data, the pedestrian 210 crossing the road 201 in front of the AV 202 at a distance of 10 meters. The distance then can be changed to a synthetic distance, e.g., 11 meters. The synthetic sensor data then can be generated with the pedestrian being at the synthetic distance from the AV 202.

1. Assigning IDs/Identifying Obstacle to vary

As mentioned above, identifying the same obstacle consistently through the re-runs of the perception algorithms is challenging because the perception algorithm does not assign obstacle IDs consistently in each run.

For example, with reference to FIG. 2, the perception model 130 can detect, from the first log data track 112, information recorded at time point T1 pertaining to the pedestrian 210 crossing the road 201 along a path 211, information about the second vehicle 212 recorded at time point T2, and information about the third vehicle 216 recorded at time T3. For example, during a first run, the perception model 130 can assign track ID1 to the pedestrian 210, track ID2 to the second vehicle 212, and track ID3 to the third vehicle 216.

However, in the re-run, e.g., in a second run, the perception model 130 can assign track ID2 to the pedestrian 210, track ID3 to the second vehicle 212, and track ID1 to the third vehicle 216. Therefore, the perception model 130 will not be able to surely identify the pedestrian 210, the second vehicle 212, and the third vehicle 216 by using the track IDs.

In embodiments, the perception model 130 identifies the obstacles in the log data by using oriented bounding boxes (OBBs) as described in detail below.

In certain implementations, the perception subsystem 102 may receive a selection of the particular obstacle to vary (e.g., track ID for the obstacle of interest) via a user input performed by a user through the input device 124 of the UI subsystem 122. For example, as described above, during a first run, the perception model 130 can assign track ID1 to the pedestrian 210.

The perception model 130 may then receive the selection input of the user to vary the actual values of the parameters for the pedestrian 210 (e.g., an obstacle of interest).

The perception model 130 may determine a centroid 230 of the pedestrian 210 and a centroid 232 of the AV 202. For simplicity, the description below refers to the pedestrian 210 and the AV 202. However, it is to be understood the operations of the perception subsystem 102 are performed with respect to the centroids of the AV 202 and the designated obstacles of interest.

Figure 3:
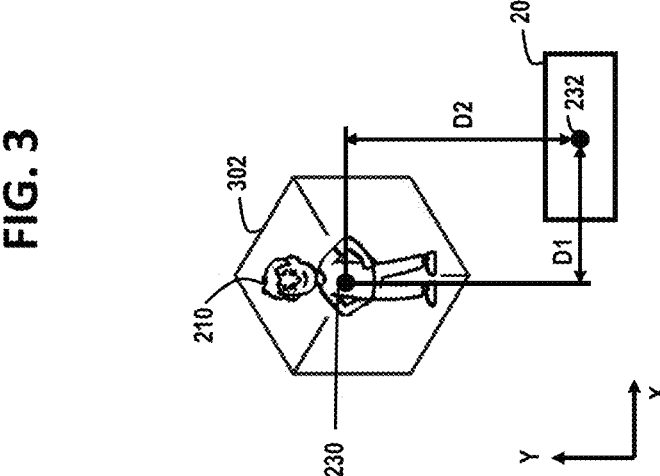
FIG. 3 shows an example of a position offset, in accordance with some embodiments.

In an embodiment, the perception subsystem 102 may include an OBB generating subsystem 134. The OBB generating subsystem 134 may determine an OBB 302 around the pedestrian 210, e.g., around the centroid 230, as shown in FIG. 3. The OBB 312 is a 3D region that allows an assumption that the pedestrian 210 will always cross this box. The OBB generating subsystem 134 identifies the OBB 302 in global coordinates, e.g., as a coordinate region the coordinates of which do not change. The OBB generating subsystem 134 may assign a region identifier to the OBB

302 and associate the region identifier and the OBB 302 with the pedestrian 210 as a first obstacle of interest. Optionally, the OBB generating subsystem 134 can store the region identifier, the coordinates of the OBB 302, and the information about the pedestrian 210 in the storage subsystem 110 or another storage or memory accessible to the perception subsystem 102.

However, the described above it is not intended to be limiting. In certain implementations, the perception subsystem 102 does not receive a selection of the particular obstacle to vary. For example, the perception subsystem 102 may receive a selection of a particular area (e.g., at least a part of a crosswalk), via the user input.

The OBB generating subsystem 134 then may determine an OBB including the particular area as a spatial region and assign a region identifier to this spatial region. The perception model 130 can then detect the obstacle of interest (e.g., the pedestrian 210) that crosses the spatial region having a particular region identifier.

As another example, the OBB generating subsystem 134 may determine OBBs for all the obstacles in the first log data track 112, e.g., a first OBB1 for the pedestrian 210, a second OBB2 for the second vehicle 212, and a third OBB3 for the third vehicle 216. The OBB generating subsystem 134 may assign a region identifier to each of the first OBB1 to the third OBB3. The OBB generating subsystem 134 can store the respective coordinates of each of the first OBB 1 to the third OBB3 in association with each region identifier, in the storage subsystem 110 or another storage or memory accessible to the perception subsystem 102. For example, the perception subsystem 102 may receive a selection of a particular region identifier via the user input. The perception model 130 can then detect the obstacle of interest that crosses the spatial region having a particular region identifier.

Once the obstacle of interest is identified according to one of the methods described above, the obstacle of interest can be correctly identified using the associated spatial region and the data for the obstacle of interest can be accurately collected even if the perception model 130 is re-run and the obstacle of interest has different attributes (e.g., a different track ID, a different shape, a different speed, etc.).

As mentioned above, the data for the obstacle of interest is collected by the perception model 130 relative to the centroid determined for the obstacle of interest, e.g., the pedestrian 210.

The information may be stored in a time queue order. For example, everything that is happening with the pedestrian 210 can be recorded as time series data, for the original run of the perception algorithms on the log data and subsequent re-runs of the perception algorithms on the synthetic data.

Once the time series data is obtained for the original run of the perception algorithms on the log data, various functions can be applied to this data. The functions could be applying a position offset (e.g., a distance offset on X-axis and/or Y-axis), time offset, and/or speed offset, e.g., the sensor data can be varied, as described in detail below, while the characteristics of the original perception output are maintained.

2. Varying Sensor Data

As described above, the perception model 130 can receive an identification of the obstacle of interest, as a non-limiting example, the pedestrian 210, in various ways. The perception model 130 then can run perception algorithm for different values of parameters associated with the pedestrian 210, to generate sets of sensor data (e.g., synthetic sensor data) for each variation of the actual value of one parameter or a combination of variations of actual values of two or more parameters.

For example, the perception subsystem 102 can further include a parameter value modifying subsystem 138. The parameter value modifying subsystem 138 can receive the actual value of each parameter of the pedestrian 210, where the actual values of the parameters are obtained from the time series data, which is output by the perception model for the original run of the perception algorithms on the log data, e.g., the first log data track 112. The parameter value modifying subsystem 138 can then modify the actual value of one or more parameters based on a range of values. For example, the parameter value modifying subsystem 138 may receive a selection of one or more parameters to be varied via a user input performed by a user through the input device 124 of the UI subsystem 122. The parameters to be varied may include a position offset, a start spatial position (e.g., a start detection time point), a stop spatial position (e.g., a stop detection time point), a moving speed, an acceleration or deceleration, a total crossing time (e.g., a total detection time period), etc.

For example, based on the first log data track 112, the perception model 130 determined that, when the pedestrian 210 was detected at 1:00:00 p.m. (e.g., a start detection time point), the pedestrian 210 was offset from the AV 202 by 2.5 meters on the X-axis (see D1 in FIG. 3) and by 9 meters on Y-axis (see D2 in FIG. 3). The total crossing time was 10 seconds.

The parameter value modifying subsystem 138 may change the actual values of the position offset so that the pedestrian 210 is offset from the AV 202 by a synthetic value of 2.0 meters on the X-axis and by 8 meters on the Y-axis from the respective actual values detected in the log data, while the start detection time point and the total time period of crossing remain the same.

The perception model 130 then can be executed to run the perception algorithm on the synthetic values, to generate a synthetic sensor data set.

However, the described above is not intended to be limiting. In certain implementations, the parameter value modifying subsystem 138 may receive, via a user input performed by a user through the input device 124 of the UI subsystem 122, a range of values for the parameters to be varied and may randomly sample the values within the range. The range of values may be specified, for a particular parameter, as a range from the actual value of particular parameter. As an example, the range of values for the position offset may be specified as +1 meter/−1 meter along the Y-axis and +2 meters/−2 meters along the X-axis, from the respective actual values detected in the log data. As another example, the range of values for the position offset may be specified as 0 to 5 meters along the Y-axis and 0 to 3 meters along the X-axis, from the respective actual values detected in the log data.

The perception model 130 then can be executed to run the perception algorithm on the synthetic values for the varied parameters and the actual values for non-varied parameters, to generate a plurality of synthetic sensor data sets in correspondence to each execution of the perception model 130.

As exemplarily described above, the position offset value can be varied, e.g., a distance on the X-axis and/or the Y-axis. Based on change in the position offset value, the planner subsystem 104 can measure how the AV 202 reacts when the pedestrian 210 is not in the exact same place as in the original log data. In this way, thousands of variations and thousands of simulations can be generated.

Further, as mentioned above, the actual values of other parameters can be varied. For example, instead of crossing the road at 1:00 p.m. exactly, the start detection time point can be changed to be one second later. That is, the pedestrian 210 is in the exact same position (i.e., no variation of position offset), but appears one second later. Similarly to what is discussed above, instead of a particular value, a range of plus/minus values from the respective value detected in the log data can be provided. The parameter value modifying subsystem 138 may randomly sample the values within the range.

In certain implementations, values for a combination of parameters can be varied. For example, the parameter value modifying subsystem 138 can provide a position offset and a start detection time point offset. For example, the pedestrian 210 might appear earlier and closer to the AV 202.

Accordingly, for each execution, the perception model 130 generates and outputs a set of data for the obstacle that includes the sensor data set pertaining to the obstacle parameters of the obstacle of interest. The sensor data set may include the sensor data having the actual values detected from the log data or may include the synthetic sensor data generated based on one or more synthetic values given to one or more parameters as a variation of the actual values detected from the log data.

In some embodiments, the playback speed may be varied, to be faster or slower, to vary the speed of the pedestrian 210 crossing the road. For example, instead of the pedestrian 210 crossing the road at 1 meter per second, the playback speed may be increased to increase the speed of the pedestrian 210 to 5 meters per second. The pedestrian 210 still start crossing the road at exactly 1:00 p.m., but with the speed of crossing increased to 5 meters per second, the pedestrian 210 finishes crossing at five seconds past 1:00 p.m.

C. Planner

With continuing reference to FIG. 1, the planner subsystem 104 can have functionalities of a route planner, a lane planner, a behavior planner, a behavior selector, an obstacle avoidance planner, etc. In general, the planner subsystem 104 can use the information from the perception subsystem 102, to generate a planned behavior for the AV 202.

In some implementations, the planner subsystem 104 may include a planner model 150. The planner model 150 receives each sensor data set from the perception subsystem 102. As described above, the sensor data set may include the sensor data having the actual values detected from the log data and/or may be the synthetic sensor data generated by the perception model 130 based on the synthetic values given to one or more parameters as a variation of the actual values detected from the log data.

The AV data can also be provided to the planner subsystem 104. The AV data may include the position of the AV in global coordinates, the speed of the AV, etc.

In embodiments, the planner model 150 can execute algorithms to determine behaviors of the AV 202 with respect to the pedestrian 210, e.g., staying in the lane or changing lanes left or right, decelerating to a stop or accelerating to pass through, etc. For example, given various position offsets of the pedestrian 210, the planner model 150 may command the AV 202 to start deceleration at earlier or later time. The planner model 150 may also provide different values for the deceleration.

In embodiments, the planner model 150 can receive, as an input, the data points of each sensor data set associated with parameters of the pedestrian 210 from the perception subsystem 102. The planner model 150 can then execute algorithms using the data points of a particular sensor data set and output a set of control values.

The planner subsystem 104 can further include a controller 151. The controller 151 can receive a set of control values generated for a particular sensor data set. The controller 151 can then generate and provide control commands to the AV 202. The controller 151 can use a feedback to collect information showing how closely the AV 202 follows the provided control commands, e.g., deceleration start time, deceleration value, etc.

As a result of processing performed by the planner subsystem 104, the planner subsystem 104 may output a set of error values, e.g., generated based on the feedback.

The postprocessing subsystem 108 receives the set of error values from the planner subsystem 104. The postprocessing subsystem 108 is configured to perform certain processing on the set of error values, to validate at least one from among the perception model 130 and the planner model 150.

For example, the postprocessing subsystem 108 can compare the error values to respective threshold values. In one example, the threshold values can be determined by execution of the planner model 150 on the sensor data set including the actual values for the parameters that are detected by the perception model 130, e.g., during the original run of the perception model 130 on the log data. As another example, the threshold values can be provided via a user input performed by a user through the input device 124 of the UI subsystem 122.

The postprocessing subsystem 108 can generate a validation result based on the comparison of the error values to the respective threshold values. For example, based on the error values being within the respective threshold values, the postprocessing subsystem 108 can generate the validation result indicating that the perception model and/or the planner model are validated, e.g., the AV 202 stops within a predetermined time period, the AV 202 stops at a predetermined distance from the pedestrian 210, etc.

Optionally, the postprocessing subsystem 108 can provide the validation result to the UI subsystem 122.

D. Filtering

As mentioned above, the model validation system 100 may include the filtering subsystem 103. The filtering subsystem 103 is configured to filter the sensor data sets output by the perception subsystem 102 prior to the sensor data sets being provided to the planner subsystem 104.

For example, the filtering subsystem 103 may perform certain processing on the sensor data sets to filter the sensor data sets based on filtering rules 156. The filtering rules 156 may include a first rule to filter out all the data except for the data related to the obstacle of interest (e.g., the pedestrian 210), a second rule to filter out transient objects (e.g., leaves blowing across the AV 202), a third rule to filter out all of the unidentified objects, etc.

For example, the perception subsystem 102 may receive a selection of the particular rule to use in the filtering, e.g., a first rule, via a user input performed by a user through the input device 124 of the UI subsystem 122. As another example, a rule can be set as a default.

The filtering subsystem 103 may filter out, from the sensor data sets, all information that is not related to the pedestrian 210 (or another designated obstacle of interest). As a result of filtering performed according to the first rule, the perception subsystem 102 may provide, to the planner subsystem 104, the filtered sensor data sets containing data of the pedestrian 210 and the AV 202.

However, the described above is not intended to be limiting. In some embodiments, the processing performed by the filtering subsystem 103 may be omitted and the sensor data sets can be provided to the planner subsystem 104 without any filtering operations performed thereon.

The AV data can also be provided to the planner subsystem 104. The AV data may include the position of the AV in global coordinates, the speed of the AV, etc.

III. Method

FIGS. 4A and 4B show a simplified block diagram of a processing 400 performed by the model validation system 100 in accordance with various embodiments. The processing 400 may be performed by some or all of the perception subsystem 102, the filtering subsystem 103, the planner subsystem 104, and the postprocessing subsystem 108. The processing 400 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIGS. 4A and 4B and described below is intended to be illustrative and non-limiting. Although FIGS. 4A and 4B depict the various processing operations occurring in a particular sequence or order, this is not intended to be limiting. In certain alternative embodiments, the processing 400 may be performed in some different order or some operations may be performed at least partially in parallel.

Referring to FIG. 4A, at operation 402, log data is input to a perception model 130, the log data including (1) sensor data of a plurality of objects around an AV and (2) information about events occurring with respect to the AV and an obstacle of interest among the plurality of objects, where the plurality of objects is detected by on-vehicle sensors detecting an environment surrounding the AV, where the information includes obstacle parameters associated with the obstacle of interest, each obstacle parameter having an actual value detected by the on-vehicle sensors.

In some embodiments, the obstacle parameters include some or all of a start detection time point, a total detection time period, a distance from the AV on the X-axis, a distance from the AV on Y-axis, and a moving speed.

At operation 404, the perception model 130 can detect from the environment captured in the sensor data, a coordinate region within which the obstacle of interest appears.

In some embodiments, the detecting the coordinate region includes receiving, through a user interface 122, a user input selecting the obstacle of interest or an area of the environment captured in the sensor data; and generating, in global coordinates, an OBB surrounding the obstacle of interest or the area, to obtain the coordinate region.

In some embodiments, detecting the coordinate region includes receiving, through a user interface 122, a user input selecting the obstacle of interest of the environment captured in the sensor data; computing a centroid of a bounding box of the obstacle of interest in global coordinates; and generating an OBB in the global coordinates to obtain the coordinate region, the OBB surrounding the centroid of the bounding box of the obstacle of interest.

At operation 406, the perception model 130 can output a set of data including a set of values associated with the obstacle parameters, each obstacle parameter being associated with the actual value detected for the obstacle parameter or a synthetic value derived from the actual value.

In some embodiments, the synthetic value is varied by a predetermined value from the actual value or randomly chosen from a range of values that are adjacent to the actual value.

At operation 408, the set of values associated with the obstacle parameters can be input into a planner model 150, to generate a set of values for parameters associated with a behavior of the AV with respect to the obstacle of interest.

Referring to FIG. 4B, at operation 410, during a re-run of the perception model 130, the perception model 130 can detect the coordinate region in the log data or simulated data derived from the log data.

At operation 412, during a re-run of the perception model 130, the perception model 130 can detect the same obstacle of interest, as an object that at least partially overlaps the coordinate region.

In some embodiments, detecting the same obstacle of interest includes detecting the object whose centroid is within the OBB.

At operation 414, the perception model 130 can output an updated set of data that includes an updated set of values associated with the obstacle parameters, each obstacle parameter is associated with the actual value detected for the obstacle parameter or an updated synthetic value derived from the actual value.

At operation 416, the updated set of values associated with the obstacle parameters is input into the planner model 150, to generate an updated set of values for the parameters associated with the behavior of the AV with respect to the obstacle of interest.

At operation 418, the postprocessing subsystem 108 can generate a validation result based on the set of values for the parameters for the AV and the updated set of values for the parameters for the AV that is obtained during the re-run.

At operation 420, the postprocessing subsystem 108 can validate the perception model 130, the planner model 150, or both based on the validation result.

In some embodiments, the log data further includes information about events occurring with respect to the AV and a plurality of obstacles among the plurality of objects, the obstacle of interest being included in the plurality of obstacles, each obstacle of the plurality of obstacles is associated with a set of parameters, the information in the log data includes, for each parameter of the set of parameters that is associated with the obstacle, an actual value detected by the on-vehicle sensors, the perception model outputs a plurality of data sets respectively associated with each obstacle of the plurality of obstacles, each of the plurality of data sets for each obstacle includes a set of values for the set of parameters for the obstacle, and each set of values for each set of parameters includes one or more actual values for one or more non-varied parameters, which are parameters that are not varied from the set of parameters of the obstacle, and at least one synthetic value for at least one varied parameter, which is at least one parameter that is varied from the set of parameters of the obstacle.

In some embodiments, prior to the inputting the set of data for the obstacle parameters into the planner model, the plurality of data sets is filtered based on a filtering rule, the filtering rule specifying to filter out all data except for data associated with the obstacle of interest.

IV. Example Computer System

Any of the computer systems mentioned herein may utilize any suitable number of subsystems. Examples of such subsystems are in computer system 10 of FIG. 5. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

Figure 5:
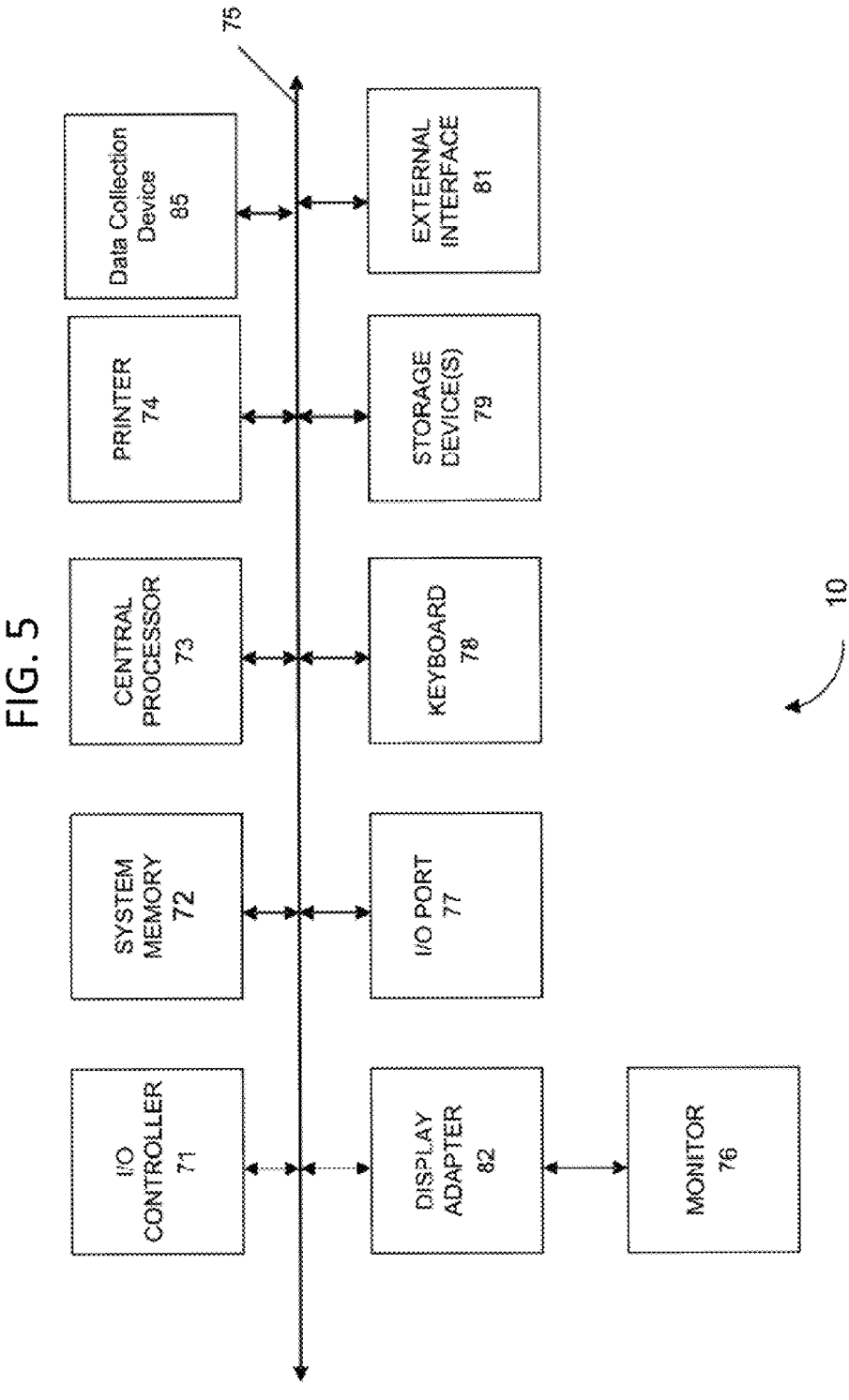
FIG. 5 shows a block diagram of an exemplary computer apparatus, in accordance with some embodiments.

The subsystems shown in FIG. 5 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer-readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g., an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, any related art or object-oriented techniques. The software code may be stored as a series of instructions or commands on a computer-readable medium for storage and/or transmission. A suitable non-transitory computer-readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method performed by one or more processors of a computer system, the method comprising:
   inputting log data to a perception model, the log data including sensor data of a plurality of objects around an autonomous vehicle (AV) and information about events occurring with respect to the AV and an obstacle of interest among the plurality of objects, wherein the plurality of objects is detected by on-vehicle sensors detecting an environment surrounding the AV, wherein the information comprises obstacle parameters associated with the obstacle of interest, each obstacle parameter having an actual value detected by the on-vehicle sensors;
   detecting, by the perception model from the environment captured in the sensor data, a coordinate region within which the obstacle of interest appears;
   outputting, by the perception model, a set of data including a set of values associated with the obstacle parameters, each obstacle parameter being associated with the actual value detected for the obstacle parameter or a synthetic value derived from the actual value;
   inputting the set of values associated with the obstacle parameters into a planner model, to generate a set of values for parameters associated with a behavior of the AV with respect to the obstacle of interest;
   during a re-run of the perception model, detecting, by the perception model, the coordinate region in the log data or simulated data derived from the log data;
   detecting, by the perception model, the obstacle of interest as an object that at least partially overlaps the coordinate region;
   outputting, by the perception model, an updated set of data that includes an updated set of values associated with the obstacle parameters, each obstacle parameter is associated with the actual value detected for the obstacle parameter or an updated synthetic value derived from the actual value;
   inputting the updated set of values associated with the obstacle parameters into the planner model, to generate an updated set of values for the parameters associated with the behavior of the AV with respect to the obstacle of interest;
   generating a validation result based on the set of values for the parameters for the AV and the updated set of values for the parameters for the AV that is obtained during the re-run; and
   validating the perception model, the planner model, or both based on the validation result.

2. The method of claim 1, wherein the detecting the coordinate region further comprises:
   receiving, through a user interface, a user input selecting the obstacle of interest or an area of the environment captured in the sensor data; and
   generating, in global coordinates, an oriented bounding box (OBB) surrounding the obstacle of interest or the area, to obtain the coordinate region.

3. The method of claim 2, wherein the detecting the obstacle of interest as the object further comprises:
   during the re-run, detecting, as the obstacle of interest, the object whose centroid is within the OBB.

4. The method of claim 1, wherein the detecting the coordinate region further comprises:
   receiving, through a user interface, a user input selecting the obstacle of interest of the environment captured in the sensor data;
   computing a centroid of a bounding box of the obstacle of interest in global coordinates; and
   generating an oriented bounding box (OBB) in the global coordinates to obtain the coordinate region, the OBB surrounding the centroid of the bounding box of the obstacle of interest.

5. The method of claim 1, wherein the obstacle parameters include some or all of a start detection time point, a total detection time period, a distance from the AV on an X-axis, a distance from the AV on a Y-axis, and a moving speed.

6. The method of claim 1, wherein the synthetic value is varied by a predetermined value from the actual value or randomly chosen from a range of values that are adjacent the actual value.

7. The method of claim 1, wherein:

the log data further includes information about events occurring with respect to the AV and a plurality of obstacles among the plurality of objects, the obstacle of interest being included in the plurality of obstacles, each obstacle of the plurality of obstacles is associated with a set of parameters, the information in the log data comprises, for each parameter of the set of parameters that is associated with the obstacle, an actual value detected by the on-vehicle sensors, and the perception model outputs a plurality of data sets respectively associated with each obstacle of the plurality of obstacles.

8. The method of claim 7, wherein:

each of the plurality of data sets for each obstacle includes a set of values for the set of parameters for the obstacle, and each set of values for each set of parameters includes one or more actual values for one or more non-varied parameters, which are parameters that are not varied from the set of parameters of the obstacle, and at least one synthetic value for at least one varied parameter, which is at least one parameter that is varied from the set of parameters of the obstacle.

9. The method of claim 8, further comprising:

prior to the inputting the set of data for the obstacle parameters into the planner model, filtering the plurality of data sets based on a filtering rule.

10. The method of claim 9, wherein the filtering rule specifies to filter out all data except for data associated with the obstacle of interest.

11. A computer system comprising:

a processor; and a non-transitory computer readable medium comprising instructions that, when executed by the processor, cause the processor to perform a method including:

inputting log data to a perception model, the log data including (1) sensor data of a plurality of objects around an autonomous vehicle (AV) and (2) information about events occurring with respect to the AV and an obstacle of interest among the plurality of objects, wherein the plurality of objects is detected by on-vehicle sensors detecting an environment surrounding the AV, wherein the information comprises obstacle parameters associated with the obstacle of interest, each obstacle parameter having an actual value detected by the on-vehicle sensors;

detecting, by the perception model from the environment captured in the sensor data, a coordinate region within which the obstacle of interest appears;

outputting, by the perception model, a set of data including a set of values associated with the obstacle parameters, each obstacle parameter being associated with the actual value detected for the obstacle parameter or a synthetic value derived from the actual value;

inputting the set of values associated with the obstacle parameters into a planner model, to generate a set of values for parameters associated with a behavior of the AV with respect to the obstacle of interest;

during a re-run of the perception model, detecting, by the perception model, the coordinate region in the log data or simulated data derived from the log data;

detecting, by the perception model, the obstacle of interest as an object that at least partially overlaps the coordinate region;

outputting, by the perception model, an updated set of data that includes an updated set of values associated with the obstacle parameters, each obstacle parameter is associated with the actual value detected for the obstacle parameter or an updated synthetic value derived from the actual value;

inputting the updated set of values associated with the obstacle parameters into the planner model, to generate an updated set of values for the parameters associated with the behavior of the AV with respect to the obstacle of interest;

generating a validation result based on the set of values for the parameters for the AV and the updated set of values for the parameters for the AV that is obtained during the re-run; and validating the perception model, the planner model, or both based on the validation result.

12. The computer system of claim 11, wherein the detecting the coordinate region further includes:

receiving, through a user interface, a user input selecting the obstacle of interest or an area of the environment captured in the sensor data; and generating, in global coordinates, an oriented bounding box (OBB) surrounding the obstacle of interest or the area, to obtain the coordinate region.

13. The computer system of claim 12, wherein the detecting the obstacle of interest as the object further includes:

during the re-run, detecting, as the obstacle of interest, the object whose centroid is within the OBB.

14. The computer system of claim 11, wherein the detecting the coordinate region further includes:

receiving, through a user interface, a user input selecting the obstacle of interest of the environment captured in the sensor data;

computing a centroid of a bounding box of the obstacle of interest in global coordinates; and generating an oriented bounding box (OBB) in the global coordinates to obtain the coordinate region, the OBB surrounding the centroid of the bounding box of the obstacle of interest.

15. The computer system of claim 11, wherein the obstacle parameters include some or all of a start detection time point, a total detection time period, a distance from the AV on an X-axis, a distance from the AV on a Y-axis, and a moving speed.

16. The computer system of claim 11, wherein the synthetic value is varied by a predetermined value from the actual value or randomly chosen from a range of values that are adjacent the actual value.

17. The computer system of claim 11, wherein:

the log data further includes information about events occurring with respect to the AV and a plurality of obstacles among the plurality of objects, the obstacle of interest being included in the plurality of obstacles, each obstacle of the plurality of obstacles is associated with a set of parameters, the information in the log data comprises, for each parameter of the set of parameters that is associated with the obstacle, an actual value detected by the on-vehicle sensors, and the perception model outputs a plurality of data sets respectively associated with each obstacle of the plurality of obstacles.

18. The computer system of claim 17, wherein:

each of the plurality of data sets for each obstacle includes a set of values for the set of parameters for the obstacle, and each set of values for each set of parameters includes one or more actual values for one or more non-varied parameters, which are parameters that are not varied from the set of parameters of the obstacle, and at least one synthetic value for at least one varied parameter, which is at least one parameter that is varied from the set of parameters of the obstacle.

19. The computer system of claim 18, wherein the method further includes:

prior to the inputting the set of data for the obstacle parameters into the planner model, filtering the plurality of data sets based on a filtering rule.

20. The computer system of claim 19, wherein the filtering rule specifies to filter out all data except for data associated with the obstacle of interest.

* * * * *